US009547834B2

(12) United States Patent
Nayyar et al.

(10) Patent No.: US 9,547,834 B2
(45) Date of Patent: Jan. 17, 2017

(54) TRANSACTION PERFORMANCE MONITORING

(71) Applicant: Bank of America Corporation, Charlotte, NC (US)

(72) Inventors: Ashish K. Nayyar, Hyderabad (IN); Amit Subhash Dixit, Hyderabad (IN); Trivikram Piduru, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 192 days.

(21) Appl. No.: 14/150,247

(22) Filed: Jan. 8, 2014

(65) Prior Publication Data

US 2015/0193263 A1  Jul. 9, 2015

(51) Int. Cl.
*G06F 7/00* (2006.01)
*H04L 12/815* (2013.01)
*G06Q 10/06* (2012.01)

(52) U.S. Cl.
CPC .................................... *G06Q 10/06* (2013.01)

(58) Field of Classification Search
USPC .... 707/706; 711/167–168; 370/236; 709/224
See application file for complete search history.

(56) References Cited

U.S. PATENT DOCUMENTS

| | | | |
|---|---|---|---|
| 6,073,089 A | 6/2000 | Baker et al. | |
| 6,182,249 B1 | 1/2001 | Wookey et al. | |
| 7,069,263 B1 | 6/2006 | Yee et al. | |
| 7,107,339 B1 | 9/2006 | Wolters | |
| 7,389,211 B2 | 6/2008 | Abu El Ata et al. | |
| 7,392,248 B2 | 6/2008 | Bakalash et al. | |
| 7,448,048 B1 | 11/2008 | Nesamoney et al. | |

(Continued)

OTHER PUBLICATIONS

CA Introscope. IBM. Last Modified Jan. 2, 2014. Retrieved from [http://www-304.ibm.com/partnerworld/gsd/solutiondetails.do?solution=23517&expand=true] on Jan. 27, 2014.

(Continued)

*Primary Examiner* — Hung T Vy
(74) *Attorney, Agent, or Firm* — Banner & Witcoff, Ltd.; Michael A. Springs

(57) ABSTRACT

Aspects of the present disclosure provide systems and methods directed toward monitoring transactions between computing resources of a computing system. A transaction agent may monitor transactions between computing resources and generate transaction log information corresponding to the transactions. A current transaction rate for a current time period and a previous transaction rate for a previous time period may be automatically obtained based on transaction log information. The current transaction rate may be compared to the previous transaction rate, and a transaction rate alert may be generated responsive to determining that the previous transaction rate exceeds the current transaction rate. A current and previous transaction latency average may also be obtained based on transaction time information of the transaction log information. The transaction latency averages may be compared, and a transaction latency alert may be generated responsive to determining that the current transaction latency average exceeds the previous transaction latency average.

19 Claims, 10 Drawing Sheets

(56) References Cited

U.S. PATENT DOCUMENTS

| | | | |
|---|---|---|---|
| 7,483,968 B1* | 1/2009 | Rambacher | H04L 67/306 |
| | | | 709/203 |
| 7,568,025 B2 | 7/2009 | Vasudeva | |
| 7,577,731 B2 | 8/2009 | Frey et al. | |
| 7,640,547 B2 | 12/2009 | Neiman et al. | |
| 7,930,262 B2 | 4/2011 | Friedlander et al. | |
| 7,930,595 B2 | 4/2011 | Gooding | |
| 8,015,176 B2 | 9/2011 | Colby et al. | |
| 8,122,123 B2 | 2/2012 | Bhattacharya et al. | |
| 8,140,682 B2 | 3/2012 | Murthy et al. | |
| 8,209,274 B1 | 6/2012 | Lin et al. | |
| 8,271,537 B2 | 9/2012 | Schabenberger et al. | |
| 8,380,838 B2 | 2/2013 | Bose et al. | |
| 8,437,987 B2 | 5/2013 | Verseput et al. | |
| 8,463,736 B2 | 6/2013 | Bakalash et al. | |
| 8,464,278 B2 | 6/2013 | Nesamoney et al. | |
| 8,495,007 B2 | 7/2013 | Williamson | |
| 2005/0262323 A1* | 11/2005 | Woo | G06F 13/1631 |
| | | | 711/167 |
| 2006/0178982 A1 | 8/2006 | Ramsey et al. | |
| 2008/0059972 A1 | 3/2008 | Ding et al. | |
| 2009/0037914 A1* | 2/2009 | Chagoly | G06F 11/3006 |
| | | | 718/101 |
| 2009/0271511 A1* | 10/2009 | Peracha | G06F 11/3419 |
| | | | 709/224 |
| 2011/0035485 A1* | 2/2011 | Martin | G06F 11/3419 |
| | | | 709/224 |
| 2012/0109703 A1 | 5/2012 | Agrawal et al. | |
| 2012/0173717 A1 | 7/2012 | Kohli | |
| 2012/0254395 A1 | 10/2012 | Bonas | |
| 2012/0278135 A1 | 11/2012 | Haber | |
| 2013/0013248 A1 | 1/2013 | Brugler et al. | |
| 2013/0219068 A1 | 8/2013 | Ballani et al. | |
| 2013/0322255 A1* | 12/2013 | Dillon | H04L 47/22 |
| | | | 370/236 |
| 2014/0089621 A1* | 3/2014 | Hagspiel | G06F 13/161 |
| | | | 711/168 |
| 2015/0222516 A1* | 8/2015 | Deval | H04L 67/1029 |
| | | | 370/253 |

OTHER PUBLICATIONS

CA Application Performance Management. CA Technologies. Copyright 2014. Retrieved from [http://www.ca.com/us/application-management-details.aspx] on Jan. 27, 2014.

CA Application Performance Management 9.5 Data Sheet. CA Technologies. Copyright 2013. Retrieved from [http://www.ca.com/us/~/media/Files/DataSheets/ca-application-performance-management.PDF] on Jan. 27, 2014.

"Performance Metrics Monitoring with Introscope by Wily"; retrieved online at http://help.sap.com/saphelp_sm71_sp01/helpdata-en-3d/bdd41a171744569b0b39f141d9db3/content.htm, date unknown.

* cited by examiner

TRANSACTION PERFORMANCE MONITORING

CROSS-REFERENCE TO RELATED APPLICATION

This application is related to commonly owned U.S. patent application Ser. No. 14/150,252 entitled "DATA METRICS ANALYTICS" and concurrently filed on Jan. 8, 2014, which is incorporated by reference in its entirety herein.

BACKGROUND

A business enterprise may employ service gateways to route transactions between computing resources of a computing system. The service gateway may include a transaction monitoring agent to monitor the transactions and generate transaction logs. Some transaction monitoring agents store the transaction information in the transaction logs using a raw data format. As a result the transaction information contained in these types of transaction logs is not easily accessible and is not readily understandable to an end user. Furthermore the transaction logs might only be utilized during an investigation into the cause of a technical issue that has already occurred at the computing system. As a result an enterprise might not take full advantage of the information contained in the transaction logs to maintain the health and status of its computing systems. Therefore a need exists for improved approaches to utilizing the transaction log information collected by transaction monitoring agents of service gateways.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides a computer-implemented method for monitoring transaction processing at a computing system. A transaction agent may monitor transactions between computing resources of a computing system. Transaction log information corresponding to the transaction may be generated. A current transaction rate may be automatically obtained for a current time period based on the transaction log information. A previous transaction rate may also be obtained for a previous time period prior to the current time period based on the transaction log information. The current transaction rate may be compared to the previous transaction rate, and a transaction rate alert may be generated responsive to determining that the previous transaction rate exceeds the current transaction rate. A current transaction latency average and a previous transaction latency average may also be respectively obtained for the current and previous time period based on transaction time information included in the transaction log information. The transaction latency averages may also be compared, and a transaction latency average may be generated responsive to determining that the current transaction latency average exceeds the previous transaction latency average.

A second aspect described herein provides a system for monitoring transaction processing at a computing system. The system may include at least one processor and a data store that stores transaction log information. The transaction log information may be collected by a transaction monitoring agent and correspond to transactions performed between computing resources of a computing system. The transaction log information may include transaction time information. A transaction log evaluation module may be configured to, in operation, parse the transaction log information to obtain a current transaction metric for a current time period and a previous transaction metric for a previous time period prior to the current time period based on the transaction log information. A transaction status evaluation module may be configured to, in operation, compare the current transaction metric to the previous transaction metric. The transaction status evaluation module may also be configured to, in operation, determine whether to trigger an alert based on the comparison between the current transaction metric and previous transaction metric. An alert module may be configured to, in operation, generate the alert responsive to determining that the current transaction metric deviates from the previous transaction metric by greater than a predetermined transaction metric difference threshold.

A third aspect described herein provides non-transitory computer-readable media having instructions stored thereon that, when executed by a processor, cause a computing device to perform steps for monitoring transaction processing at a computing system. Transaction log information may be generated using a transaction monitoring agent. The transaction log information may correspond to transactions occurring between computing resources of a computing system. A transaction log evaluation module may automatically obtain a first transaction rate for a first time period based on the transaction log information. The transaction log evaluation module may also automatically obtain a second transaction rate for a second time period prior to the first time period based on the transaction log information. A transaction status evaluation module may compare the first transaction rate to the second transaction rate, and an alert module may generate a transaction rate alert responsive to determining at the transaction status evaluation module that the second transaction rate exceeds the first transaction rate.

These and additional aspects will be appreciated with the benefit of the detailed description provided below.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Figure 1:
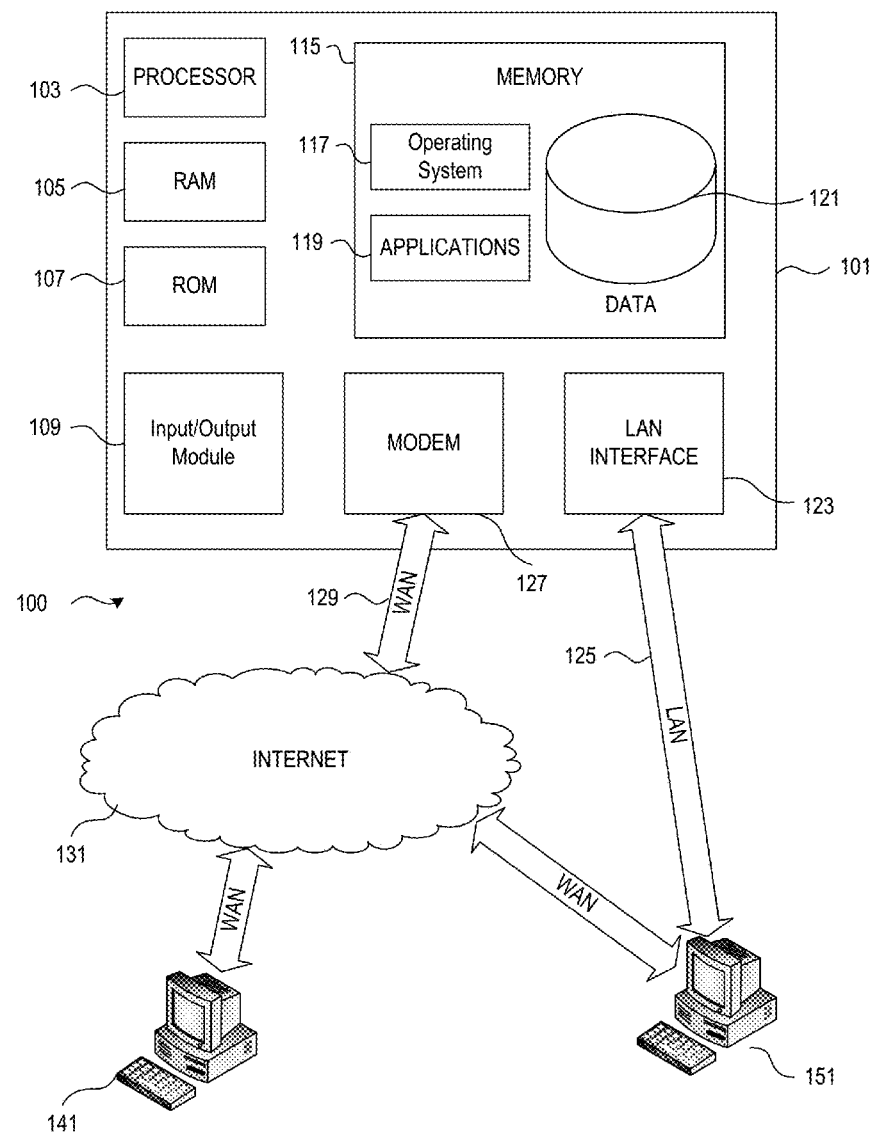
FIG. 1 is a block diagram of an example operating environment in which various aspects of the disclosure may be implemented.

Aspects of the present disclosure are directed toward evaluating transaction logs generated by transaction monitoring agents that monitor transaction metrics at an enterprise computing system. Enterprise computing systems may include thousands of computing resources in communication with each other to carry out various transactions. Enterprise computing systems may include service gateways to route transaction requests and transaction responses to appropriate computing resources. In order to ensure robust transaction processing, the service gateways may include transaction monitoring agents that monitor the transactions between the computing resources. While monitoring the transactions, the transaction monitoring agents may log information regarding the transactions. The transaction evaluation system described in further detail below is configured to parse the transaction log information contained in the transaction logs, evaluate the transaction log information to automatically identify deviations in various transaction metrics, and convert the transaction log information to a more user-friendly format for presentation at a user interface dashboard. The transaction evaluation system described below may further be configured to provide automatic alerts upon detection of deviations in transaction metrics, proactively warn of potential deviations in transaction metrics, and allow a user to select computing resources and time periods in order to evaluate and compare transaction log information.

The transaction evaluation system described herein also provides other advantages through evaluation of the transaction log information collected by transaction monitoring agents. One advantage the transaction evaluation system described in further detail below provides is the ability to automatically identify dependencies between applications through evaluation of the transaction log information. Based on the dependencies identified, the transaction evaluation system may proactively alert management teams to potential deviations in transaction metrics at downstream applications resulting from deviations in transaction metrics detected at upstream applications. In addition the transaction evaluation system may be capable of dynamically adjusting transaction metric thresholds used to trigger alerts. In this way, alerts for deviations in transaction metrics may not be generated where such deviations are expected, e.g., due to increased traffic volume or network latency. The transaction evaluation system may also provide improved approaches to aggregating transaction log information for multiple computing resources deployed throughout the enterprise computing system. Each of these advantages will be described in further detail below.

In practice some enterprises may maintain enterprise-wide computing systems having over twenty thousand application instances deployed across thousands of application servers. These computing resources may handle millions of transactions per day, and a transaction may be processed on a scale of milliseconds. It will thus be appreciated that these enterprises may generate huge amounts of transaction log information while monitoring transactions. Due to the sheer volume of the transaction log information generated, it will be appreciated that manual review and evaluation of such information to maintain the health of the enterprise computing system is not feasible. It will thus be recognized that the automated and programmed processes of computing systems are a significant aspect of the systems and methods used to monitor transactions and evaluate such large amounts of transaction log information with the speed necessary to provide real-time services to end users.

For the description provided below, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition, "set" as used in this description refers to a collection that may include one element or more than one element. Moreover, aspects of the disclosure may be implemented in non-transitory computer-readable media having instructions stored thereon that, when executed by a processor, cause the processor to perform various steps described in further detail below. As used in this description, non-transitory computer-readable media refers to all computer-readable media with the sole exception being a transitory propagating signal.

FIG. 1 illustrates a block diagram of at least a portion of a transaction evaluation system 101 (e.g., a computer server) in communication system 100 that may be used according to an illustrative embodiment of the disclosure. The system 101 may have a processor 103 for controlling overall operation of the system and its associated components, including RAM 105, ROM 107, input/output (I/O) module 109, and memory 115.

I/O 109 may include a microphone, keypad, touch screen, and/or stylus through which a user of the transaction evaluation system 101 may provide input, and may also include one or more of a speaker for providing audio output and a video display device for providing textual, audiovisual and/or graphical output. Software may be stored within memory 115 and/or storage to provide instructions to processor 103 for enabling the system 101 to perform various functions. For example, memory 115 may store software used by the system 101, such as an operating system 117, application programs 119, and an associated database 121. Processor 103 and its associated components may allow the system 101 to run a series of computer-readable instructions to evaluate transaction log information collected by a transaction monitoring agent.

The system 101 may operate in a networked environment supporting connections to one or more remote computers, such as terminals 141 and 151. The terminals 141 and 151 may be personal computers or servers that include many or all of the elements described above relative to the system 101. Alternatively, terminal 141 and/or 151 may be a data store that utilized by the system 101. The network connections depicted in FIG. 1 include a local area network (LAN) 125 and a wide area network (WAN) 129, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as the Internet 131. It will be appreciated that the network connections shown are illustrative and other means of establishing a communications link between the computers may be used. Various well-known protocols such as TCP/IP, Ethernet, FTP, HTTP and the like may be used to establish connections and/or facilitate communications between elements of system 101 and various other computing devices.

Additionally, one or more application programs 119 used by the transaction evaluation system 101 according to an illustrative embodiment of the disclosure may include computer executable instructions for evaluating transaction log information collected by a transaction monitoring agent.

The transaction evaluation system 101 and/or terminals 141 or 151 may also be mobile terminals, such as smart phones, personal digital assistants (PDAs), and the like, including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
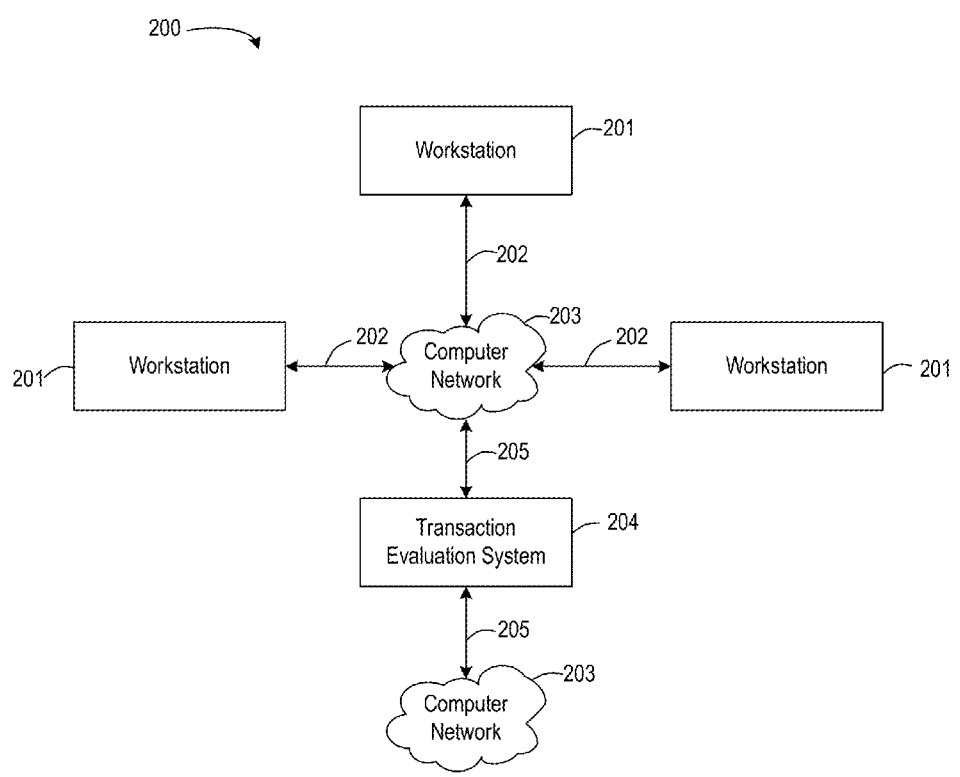
FIG. 2 is a block diagram of example workstations and servers that may be used to implement the processes and functions of one or more aspects of the present disclosure.

Referring to FIG. 2, an illustrative system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to the transaction evaluation system 204. In certain embodiments, workstations 201 may be different servers that communicate with the transaction evaluation system 204, or, in other embodiments, workstations 201 may be different points at which the transaction evaluation system 204 may be accessed. In system 200, the transaction evaluation system 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and the transaction evaluation system 204, such as network links, dial-up links, wireless links, hard-wired links, and the like.

The disclosure that follows may be implemented by one or more of the components in FIG. 1 and FIG. 2 and/or other components, including other computing devices.

Figure 3:
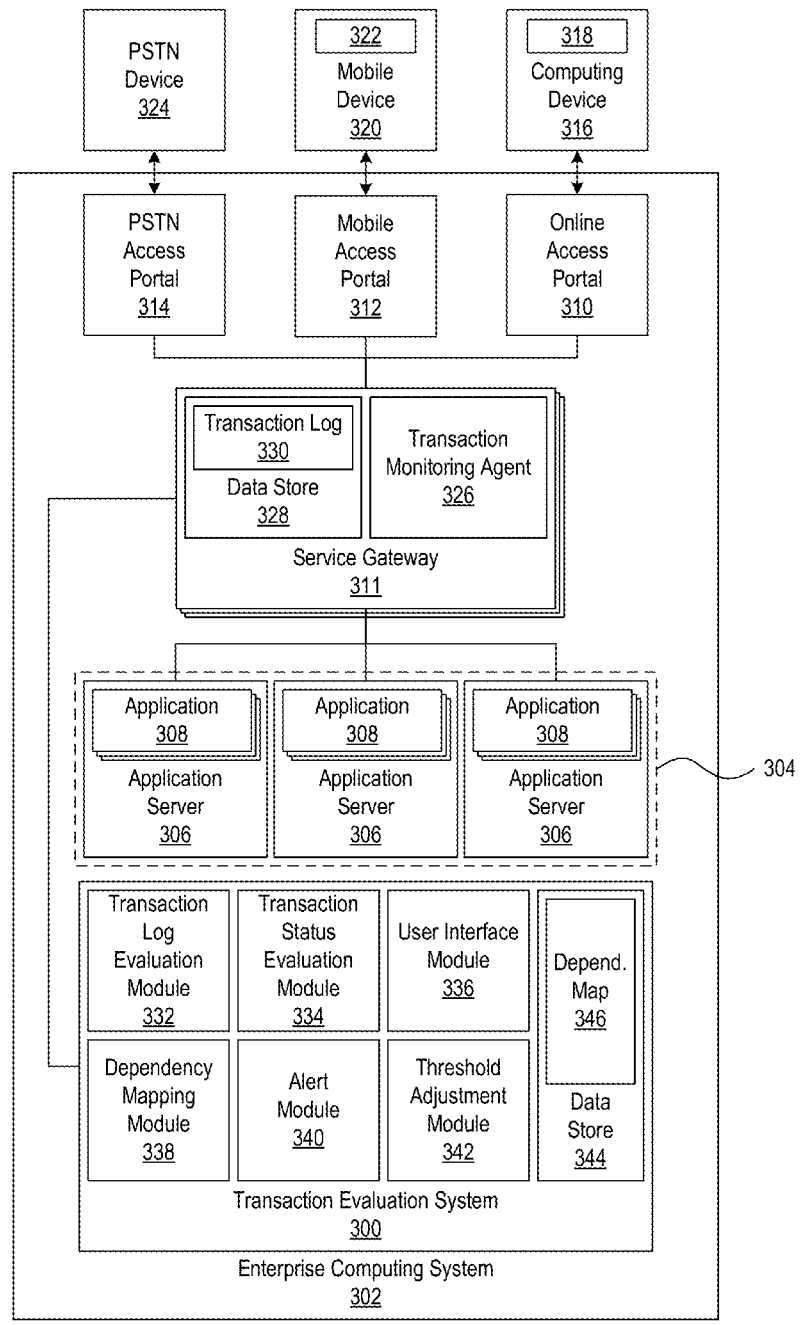
FIG. 3 is an example of an implementation of a transaction evaluation system.

Referring now to FIG. 3, an example of an implementation of a transaction evaluation system 300 is shown. The transaction evaluation system 300 may be deployed at an enterprise computing system 302 of an enterprise, e.g., a banking enterprise. As noted above, the enterprise computing system 302 may include a collection of computing resources 304. Computing resources refer to both application servers as well as applications hosted at an application server. Computing resources may also include access portals that include, e.g., web servers, used to facilitate communications between the enterprise computing system 302 and external devices such as, e.g., end-user computing devices. As seen in FIG. 3, the collection of computing resources 304 may include multiple application servers 306 each of which may host multiple applications 308 for processing transactions. The collection of computing resources 304 may be in respective communication with a service gateway 311, which routes transaction requests and responses between the computing resources.

Aspects of the present disclosure may be implemented in a variety of different contexts for which an enterprise establishes and maintains an enterprise computing system to provide various services to end users. One example context includes the banking context in which the enterprise computing system 302 may be one of the computing systems of a banking enterprise. In the context of a banking enterprise, the applications 308 hosted at the application servers 306 may provide various banking-related services, e.g., account transactions, credit card processing, and other banking-related services that will be appreciated to those skilled in the art. The transaction evaluation system 300 described herein advantageously enables an enterprise to quickly address any technical issues that affect transaction processing thereby ensuring a favorable user-experience for the end-users.

In the banking context, end-users may access the enterprise computing system 302 through various access portals. As shown by way of example in FIG. 3, the enterprise computing system 302 may include an online access portal 310, a mobile access portal 312, and a public switched telephone network (PSTN) portal 314. An end-user may access the enterprise computing system 302 through the online access portal 310 using, e.g., a computing device 316 equipped with a web browser 318 and via a communication network that includes the Internet. Using the web browser 318 as a client, an end-user may engage in various banking activities such as, e.g., opening and closing accounts, reviewing account details, transferring funds, paying bills, and other types of banking activities that will be recognized by those skilled in the art. The computing device 316 may also be an application server of another computing system in communication with the enterprise computing system 302 via a communication network such as that includes the Internet. An application server of another computing system may initiate transactions with the enterprise computing system to, for example, withdraw funds, deposit funds, and perform other types of transactions that will be appreciated by those skilled in the art.

An end-user may also access the enterprise computing system 302 through the mobile access portal 312 using, e.g., a mobile device 320 equipped with a mobile application 322 and via a communication network that includes a wireless network such as a cellular network. Using the mobile application 322 as a client, an end-user may engage in the various banking activities described above. An end-user may additionally access the enterprise computing system 302 through the PSTN access portal 314 using, e.g., a PSTN device 324 via a network that includes a landline network. A PSTN device may be, for example, a point-of-sale device used to process credit card transactions. The computing device 316, mobile device 320, and PSTN device 324 may initiate transactions with the enterprise computing system 302 by submitting transaction requests (e.g., HTTP requests) via the access portals 310-314. The access portals 310-314 may likewise deliver transaction responses to the devices (e.g., HTTP responses). Additional and alternative types and examples of PSTN devices, mobile devices, and computing devices recognizable to those skilled in the art may be selectively utilized to access the enterprise computing network.

The online access portal 310, mobile access portal 312, and PSTN access portal 314 may also be in communication with one of the service gateways 310 in order to route transaction requests received from the end-user devices to the appropriate application 308 and application server 306. The service gateways 310 may also route transaction responses from the applications 308 and application servers 306 back to the appropriate access portal for delivery to the end-user device. During processing of a requested transaction an application 308 may call on other applications to perform additional transactions during processing of the requested transaction. Accordingly the service gateway 311 may route transactions between computing resources 304 as well.

As also noted above, the service gateway 311 may include a transaction monitoring agent 326 that monitors transactions between computing resources. The transaction monitoring agent may log transaction information at a data store 328 of the service gateway 311. The data store 328 may store the transaction log information as one or more transaction logs 330. A transaction log 330 may include multiple log entries respectively corresponding to multiple transactions monitored by the transaction monitoring agent 326. Each time the service gateway 311 handles a new transaction, the transaction monitoring agent may create a new log entry in the transaction log 330 corresponding to the new transaction. The transaction log information may be an n-tuple of information items that includes, e.g., respective addresses for the source computing resource and destination computing resource, transaction time information indicating when the transaction request and transaction response were received, a flag indicating whether the transaction was successfully processed, and other types of transaction-related information that will be appreciated with the benefit of this disclosure. The addresses for the source and destination computing resources may be stored in the transaction log 330 as, e.g., Internet Protocol (IP) addresses. As noted above, the transaction evaluation system 300 leverages the transaction information contained in the transaction logs 330 during real-time monitoring and maintenance of the health and status of the enterprise computing system 302 and its computing resources 304.

In particular the transaction evaluation system 300 may be utilized to parse and evaluate the transaction log information of the transaction logs 330. As seen in FIG. 3, the transaction evaluation system 300 may be in communication with the service gateways 310 in order to access and retrieve the transaction logs 330 stored at the respective data stores 328 of the service gateways. The transaction evaluation system 300 may include various modules configured to, in operation, facilitate the evaluation of the transaction log information and determine the status of the computing resources based on the transaction log information. The transaction evaluation system 300, in this example, includes a transaction log evaluation module 332, a transaction status evaluation module 334, a user interface module 336, a dependency mapping module 338, an alert module 340, and a threshold adjustment module 342. The transaction evaluation system 300 may also include a data store 344 that stores a dependency map 346. The dependency map 346 may include relationships between related applications 308 and will be discussed in further detail below.

Various modules of the transaction evaluation system 300 may be implemented using an open-source framework having a distributed file system and configured for parallel processing using map-reduce techniques. These modules may also be implemented using an open source, non-relational, columnar, distributed database for storing evaluation results. In these example implementations, the modules may provide real-time read/write access to large data sets. The modules may also include various scripts to implement the map-reduce techniques used to evaluate the transaction log information of the transaction logs 330. The modules may utilize a job scheduler to execute the map-reduce scripts, e.g., as a cron job or batch job.

The transaction log evaluation module 332 may be configured to, in operation, parse the transaction log information of the transaction logs 330 and extract the details relating to the transaction, e.g., the computer resource addresses, transaction timestamps, and so forth. The transaction log evaluation module 332 may also be configured to, in operation, evaluate the transaction log information and obtain transaction metrics for various time periods. Transaction metrics may include transaction rates, transaction latency averages, and transaction load distribution percentages.

A transaction rate refers to the number of transactions occurring per time period, e.g., per minute, per hour, per day, per week, per month, and so forth. A transaction rate may correspond to the transactions associated with a particular computing resource 304, e.g., "Application A." A transaction rate may also correspond to the transactions between two particular computing resources 304, e.g., between "Application A" and "Application B." The transaction log evaluation module 332 may obtain a transaction rate for a computing resource 304 by selecting a desired time period and then parsing the transaction logs 330 to identify log entries within the selected time period that are associated with that computing resource. The transaction log evaluation module 332 may then sum the number of transactions that occurred within the selected time period and that are associated with the computing resource 304 in order to obtain the transaction rate for that computing resource and time period. The transaction log evaluation module 332 may obtain a transaction rate for transactions that occurred between two particular computing resources 304 in a similar fashion. The transaction log evaluation module 332 may select a desired time period and then parse the transaction logs 330 to identify log entries that are within the selected time period and that occurred between the computing resources 304. The transaction log evaluation module 332 may sum the number of transactions that occurred within the selected time period between the computing resources in order to obtain the transaction rate for those computing resources during the selected time period. The transaction log evaluation module 332 may provide the transaction rates to the user interface module 336 for presentation to a user at a user interface or to the transaction status evaluation module 334 to determine whether any deviations in transaction rates have occurred.

A transaction latency average refers to the average response time for transactions associated with a computing resource 304. A transaction latency average may likewise correspond to transactions associated with a particular computing resource (e.g., "Application Server 1") or correspond to transactions between two particular computing resources (e.g., between "Application Server 1" and "Application Server 2"). A transaction latency average may also be an average for a particular time period, e.g., a current or previous minute, hour, day, week, month, and so forth. A transaction latency may be determined based on the duration between receipt of a transaction request and receipt of a subsequent transaction response at the service gateway 311. As noted above, transaction log entries may include respective timestamps indicating a time the service gateway 311 received the transaction request and a time the service gateway received the transaction response. The transaction log evaluation module 332 may thus obtain the transaction latency for a particular transaction by determining the duration between these timestamps.

The transaction log evaluation module 332 may obtain a transaction latency average for a computing resource 304 by selecting a desired time period and then parsing the transaction logs 330 to identify log entries within the selected time period that are associated with that computing resource. The transaction log evaluation module 332 may then obtain transaction latency values for each of these transactions and determine the average of the transaction latency values in order to obtain a transaction latency average for the computing resource during selected time period. The transaction log evaluation module 332 may obtain a transaction rate for transactions that occurred between two particular computing resources 304 in a similar fashion. The transaction log evaluation module 332 may select a desired time period and then parse the transaction logs 330 to identify log entries that are within the selected time period and that occurred between the computing resources 304. The transaction log evaluation module 332 may obtain transaction latency values for each of these transactions and determine the average of the transaction latency values in order to obtain a transaction latency average for the transactions between the computing resources during the selected time period. The transaction log evaluation module 332 may provide the transaction latency averages to the user interface module 336 for presentation to a user at a user interface or to the transaction status evaluation module 334 to determine whether any deviations in transaction latency have occurred.

A transaction load distribution percentage refers to the percentage of overall transactions occurring at a particular computing resource. The transaction load distribution percentage may also be associated with a particular time period, e.g., a per minute, per hour, per day, per week, or per month transaction load distribution percentage. The transaction log evaluation module 332 may obtain a transaction load distribution percentage for a computing resource during a selected time period by parsing the transaction log information in the transaction logs 330 to identify transactions routed to that computing resource during that time period. The transaction log evaluation module 332 may thus obtain a transaction load distribution percentage for the computing resource based on the number of transactions routed to the computing resource and the overall number of transaction that occurred during the selected time period. The transaction log evaluation module 332 may provide the transaction load distribution percentages to the user interface module for presentation to a user at a user interface or to the transaction status evaluation module to determine whether any deviations in transaction load distribution have occurred during a particular time period.

The transaction log evaluation module 332 may be configured to parse the transaction log information of the transaction logs 330 and evaluate the transaction log information automatically or in response to user input. With regard to automatic evaluation of the transaction log information, the transaction log evaluation module 332 may be configured to automatically obtain transaction metrics for a current time period and a previous time period immediately preceding the current time period. In some example implementations, the transaction log evaluation module 332 may store transaction metrics for previous time periods in order to avoid recalculating transaction metrics for previous time periods. The transaction log evaluation module 332 may also be configured to continually update the transaction metrics for a current time period as additional transactions occur during that time period. With respect to per minute transaction metrics, for example, the transaction log evaluation module 332 may recalculate the transaction metrics for the current minute every few seconds (e.g., every 10 seconds) in order to update the current minute transaction metrics. With regard to per hour transaction minutes, as another example, the transaction log evaluation module 332 may recalculate the transaction metrics for the current hour every few minutes (e.g., every 5 minutes) in order to update the current hour transaction metrics. Additional examples for per day transaction metrics, per week transaction metrics, per month transaction metrics will be appreciated with the benefit of this disclosure. As discussed further below, a user may select desired computing resources and time periods for evaluation via the user interface provided by the user interface module 336. The transaction log evaluation module 332 may likewise evaluate transaction log information for transactions associated with user-selected computing resources and time periods as described above.

By continually parsing the transaction information contained in the transaction logs 330 to obtain the transaction metrics, an enterprise may thus advantageously monitor the health and status of the computing resources 304 in real-time. Any technical issues occurring at the computing resources 304 may thus be revealed through deviations in the transaction metrics, e.g., a decrease in a transaction rate or an increase in a transaction latency average. Upon detection of a deviation in a transaction metric, an alert may be generated such that remedial measures may be taken to address the issue. The transaction log evaluation module 332 may also provide the transaction metrics to the user interface module 336 for presentation to a user at a user interface. The transaction status evaluation module 334 may also provide the user interface module 336 with information relating to comparisons between transaction metrics, e.g., deviation information, for presentation at the user interface. In this way, users may monitor the status of the computing resources 304 of the enterprise computing system 302.

The transaction status evaluation module 334 may be configured to, in operation, compare current transaction metrics to previous transaction metrics and determine whether to trigger an alert based on the comparison of the current transaction metrics to the previous transaction metrics. The transaction status evaluation module 334 may compare current and previous transaction metrics once during a time period or periodically during the time period. The transaction status evaluation module 334 may determine that an alert should be generated when a current transaction metric deviates from a previous transaction metric, e.g., when the current transaction metric is greater or less than the previous transaction metric. With respect to transaction rates, the transaction status evaluation module 334 may determine an alert should be generated when a previous transaction rate exceeds a current transaction rate, i.e., when transaction rates have declined. A decline in transaction rates at a computing resource 304 may suggest a technical issue is occurring of has occurred at the computing resource that should be investigated and addressed, e.g., an application may have crashed and needs to be restarted. With respect to transaction latency averages, the transaction status evaluation module 334 may determine an alert should be generated when a current transaction latency average exceeds a previous transaction latency average, i.e., when transaction latency increases. An increase in the transaction latency average associated with a computing resource 304 may likewise suggest a technical issue that should be investigated and addressed.

In some example implementations, the transaction evaluation module 334 may utilize difference thresholds when comparing transaction metrics. When utilizing difference thresholds, the transaction status evaluation module 334 may determine an alert should be generated only when the difference between the transaction metrics exceeds the difference threshold. When comparing a current per minute transaction rate to a previous per minute transaction rate, for example, the transaction status evaluation module 334 may determine an alert should be generated when the previous per minute transaction rate exceeds the current per minute transaction rate by more than a predetermined transaction rate difference threshold, e.g., by more than 10 transactions per minute. If the previous per minute transaction rate does not exceed the current per minute transaction rate by more than the predetermined transaction rate difference threshold, in this example, then the transaction status evaluation module 334 may determine that an alert should not be generated. Similarly when comparing a current transaction latency average to a previous transaction latency average, for example, the transaction status evaluation module 334 may determine an alert should be generated when the current transaction latency average exceeds a previous transaction latency average by more than a predetermined transaction latency difference threshold, e.g., 500 milliseconds (ms). As described in further detail below the transaction metric difference thresholds may be dynamically adjusted in order to accommodate situations in which a decrease in transaction rate or an increase in transaction latency is expected.

In addition to difference thresholds, the transaction status evaluation module 334 may be configured to compare transaction metrics between time periods using absolute thresholds. Absolute thresholds may, for example, be expressed as percentages. The transaction status evaluation module 334 may, for example, determine to generate an alert when a transaction rate has decreased or a transaction latency average has increased by, e.g., more than 10%. As another example, the transaction status evaluation module 334 may be configured to compare transaction load distribution percentages to a distribution threshold. An enterprise may, in some instances, prefer that any one application server does not handle more than 20% of the overall transactions occurring at the enterprise computing system 302. The transaction status evaluation module 334 may thus set a transaction load distribution threshold to be 20%. Accordingly if the transaction status evaluation module 334 determines that a current transaction load distribution percentage for a computing resource exceeds 20% for the current time period, then the transaction status evaluation module may determine that an alert should be generated and instruct the alert module 340 to generate an alert. Absolute thresholds may also be employed for other types of transaction metrics, e.g., to trigger an alert if a transaction rate drops below 10 transactions per minute or if a transaction latency exceeds 500 ms. The transaction evaluation module 334 may utilize different thresholds depending on the time period under evaluation, e.g., a per minute threshold, a per hour threshold, and so forth.

The transaction status evaluation module 334 may be in communication with the alert module 340. Upon determining that an alert should be generated, the transaction status evaluation module 334 may instruct the alert module to generate an alert that indicates the deviation in the transaction metric. The alert may identify, for example, one or more computing resources 304 associated with the deviation in the transaction metric, the type of the transaction metric (e.g., transaction rate or transaction latency average), the difference between the transaction metrics, and other transaction-related information that will be appreciated with the benefit of this disclosure. The alerts may be, e.g., emails sent to an email address associated with an administration team responsible for maintaining the downstream application, an issue ticket created at an issue tracking system, and other types of alerts that will be appreciated by those skilled in the art.

The transaction log evaluation module 332 and the transaction status evaluation module 334 may also respectively obtain and evaluate transaction metrics for computing resources 304, time periods, and transaction metric types selected by a user via a user interface provided by the user interface module 336. The transaction log evaluation module 332 and the transaction status evaluation module 334 may provide the evaluation results back to the user interface module for display to the user at the user interface. The user interface will be discussed in further detail below with reference to FIG. 4.

The dependency mapping module 338 of the transaction evaluation system 300 may be configured to, in operation, generate a dependency map 346 for the applications 308 residing at the application servers 306 based on an evaluation of the transaction log information in the transaction logs 330. The dependency map 346 may be configured to include relationships that identify which applications 308 are related to one another in the enterprise computing system 302. An application 308 may be related to another application when, for example, the application submits a transaction request to the other application, responds to a transaction request from another application, receives a transaction response from another application, or provides a transaction response to another application. An application 308 that submits a transaction request may be referred to as the source application. An source application may also be characterized as downstream relative to the application the transaction request was submitted to. An application 308 that receives and responds to a transaction request may be referred to as the destination application. An destination application may be characterized as upstream of the application that submitted the transaction request. It will be appreciated that an application 308 may be downstream relative to some applications and upstream relative to other applications. Application servers may likewise be referred to as source application servers and destination application servers and characterized as upstream or downstream relative to one another. The dependency map 346 may be configured to indicate whether related applications 308 are upstream or downstream relative to one another. As seen in FIG. 3, the dependency map 346 may be stored at data store 344 of the transaction evaluation system 300.

As noted above the dependency mapping module 338 may identify dependencies between applications 308 based on evaluation of the transaction log information in the transaction logs 330. In particular the dependency mapping module 338 may identify dependencies between applications 308 based on transaction entries in the transaction logs 330 that identify one of the applications as the source application for a transaction and one of the applications as the destination application for the transaction. Upon locating such an entry in a transaction log 330, the dependency mapping module 338 may configure the dependency map 346 to include a relationship between the applications.

The dependency mapping module 338 may also be configured to determine which application 308 is the upstream application and which application is the downstream application based on an evaluation of the transaction log information in the transaction logs 330. In particular, the dependency mapping module 338 may determine that application identified as the source application in the transaction log entry is the downstream application and that the application identified as the destination application in the transaction log entry is the upstream application. The dependency mapping module 338 may generate an overall dependency map for all applications 308 of the enterprise computing system 302 or may generate individual dependency maps for each application of the enterprise computing system. Dependency mapping will be discussed in further detail below with reference to FIG. 9.

The dependency map 346 advantageously enables the transaction evaluation system 300 to proactively alert management teams of potential technical issues in response to deviations in transaction metrics. The alert module 340 of the transaction evaluation system 300 may be configured to, in operation, identify downstream applications for an application based on the dependency map 346 in response to receipt of a transaction metric alert for the application. More particularly, the alert module 340 may receive an instruction from the transaction status evaluation module 334 regarding a deviation in a transaction metric detected at an application 308. In response to receipt of the alert, the alert module 340 may retrieve the dependency map 346 for the application 308 and identify one or more downstream applications related to the application based on the dependency map. Deviations in transaction metrics at an upstream application might cause subsequent deviations in transaction metrics at the downstream applications. The alert module 340 may thus provide an alert to the management teams of the downstream applications indicating that a deviation in a transaction metric was detected at an upstream application, and to expect possible deviations in transaction metrics at the downstream applications. In this way, the management teams may take preventative or remedial measures to prepare for or quickly respond to any deviations in transaction metrics that subsequently occur at the downstream applications.

The threshold adjustment module 342 of the transaction evaluation system 300 may be configured to, in operation, adjust the transaction thresholds used to trigger alerts. In some instances, a decrease in transaction rate or an increase in transaction latency may be expected and not the result of a technical issue for which remedial measures are needed. During peak hours, for example, the traffic volume at an application server or the latency on the network may increase. As a result of the increased traffic volume or network latency, a decrease in the transaction rate or an increase in the transaction latency might be expected and not require an alert to notify a management team. During off-peak hours, the number of users accessing the enterprise computing system may decrease and, as a result, a decrease in the transaction rate might also be expected.

The threshold adjustment module 342 may thus be configured to determine, e.g., whether volume of traffic at an application server 306 has increased, whether the latency on the network has increased, or whether transactions are occurring during peak or off-peak hours. In some example implementations, the threshold adjustment module 342 may be configured to assess the volume of traffic or the network latency upon receipt of an instruction from the transaction status evaluation module 334. The transaction status evaluation module 334 may, for example, determine whether the transaction threshold should be adjusted before determining whether an alert should be triggered. The transaction status evaluation module 334 may thus instruct the transaction threshold adjustment module 342 to assess the traffic volume, network latency, or peak/off-peak hours and adjust the transaction metric thresholds if necessary.

If the threshold adjustment module 342 determines that the volume of traffic or the network latency has increased, then the threshold adjustment module may adjust one or more transaction metric thresholds utilized by the transaction status evaluation module 334 when evaluation transaction metrics. The threshold adjustment module 342 may also be configured to adjust transaction metric thresholds upon the start of peak and off-peak hours. Peak and off-peak hours may be user specified or automatically identified through an evaluation of the transaction log information in the transaction logs 330. In this way, the transaction status evaluation module 334 may refrain from instructing the alert module to generate alerts during periods of high traffic volume, network latency, or peak/off-peak hours in which deviations in transaction metrics might be expected.

When the threshold adjustment module 342 determines that the volume of traffic or network latency has decreased, the threshold adjustment module may revert transaction metric thresholds back to the previous level. The threshold adjustment module 342 may adjust one or more of the transaction metric thresholds. In some example implementations the threshold adjustment module 342 may be configured to evaluate the transaction log information to identify time periods where repeating patterns of transaction metric deviations are observed. The threshold adjustment module 342 may then automatically adjust transaction metric thresholds during those time periods in a proactive fashion.

Figure 4:
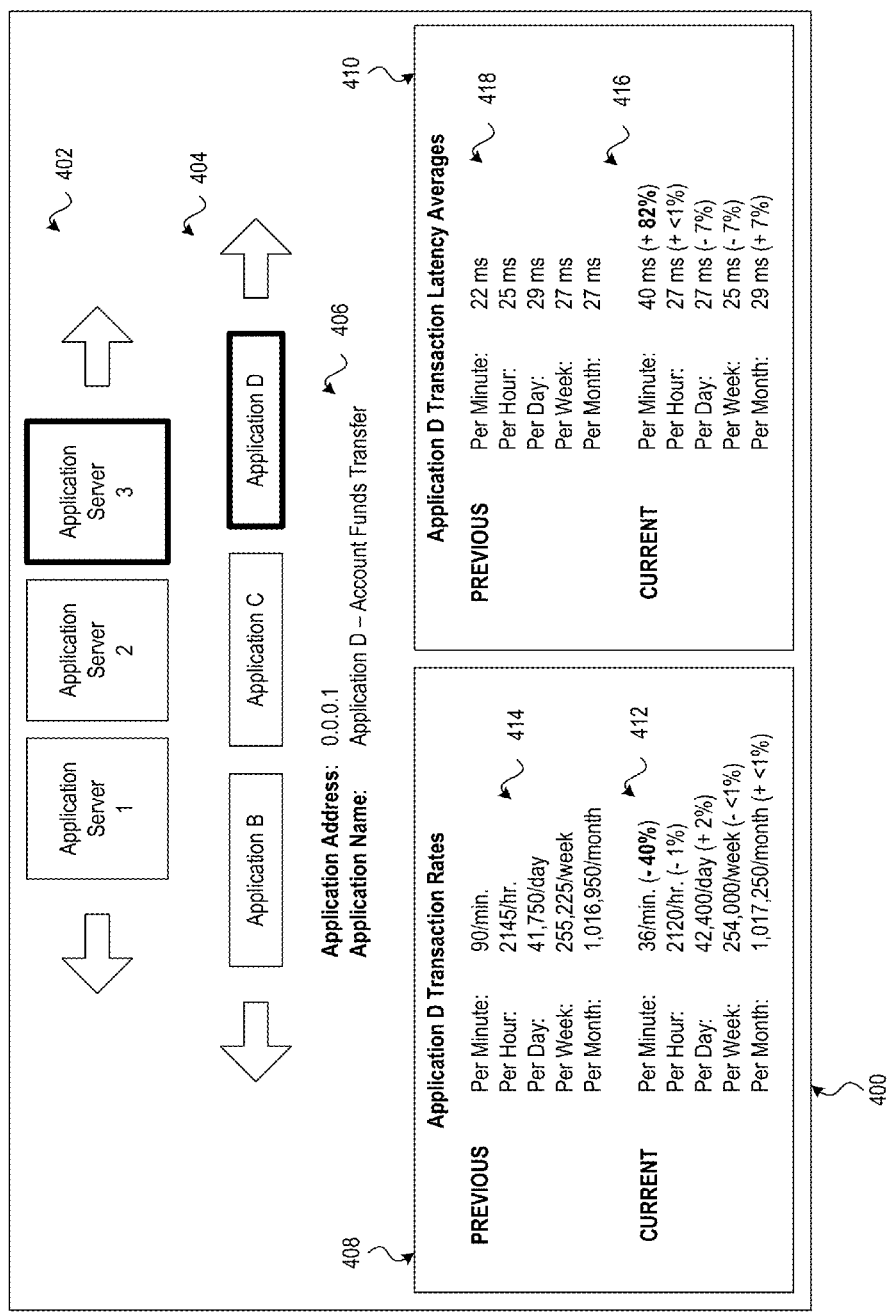
FIG. 4 is an example of an implementation of a user interface of a transaction evaluation system.

Referring now to FIG. 4, an example of an implementation of a user interface 400 of a transaction evaluation system is shown. It will be appreciated that the user interface 400 of FIG. 4 is shown by way of example only in order to illustrate various principles in accordance with the present disclosure. Additional and alternative user interfaces may exhibit additional and alternative configurations while providing at least some of the aspects related to evaluating transactions described below.

The user interface module of a transaction evaluation system may provide the user interface 400 and present the user interface to a user at a display device. The user interface 400 may include one or more lists of computing resources, which may include a list of application servers 402 and a list of applications 404 by way of example in FIG. 4. The computing resources listed at the user interface 400 may be selectable by a user to view transaction metrics associated with the selected computing resource. Upon selection of an application server at the user interface 400, for example, the list of applications 404 may be updated to display the applications hosted by the selected application server. A user may then select one of the applications listed to display information associated with that application. As seen in FIG. 4, "Application Server 3" and "Application D" have been selected indicated by a bolded outline in FIG. 4.

As seen in FIG. 4, the information presented at the user interface 400 for a selected application may include descriptive information 406 and transaction metric information 408 and 410. The descriptive application information 406 may include, e.g., the address of the application at an application server as well as a more user-friendly descriptive application name. The transaction log evaluation module may parse the address from the transaction logs and convert the address to an application name. The transaction log evaluation module may convert an address to an application name based on, e.g., a mapping between computing resource addresses and application names stored at a data store of the transaction evaluation system.

The transaction information presented for a selected application may also include transaction metric information. In FIG. 4, the transaction metric information presented for the selected application includes multiple transaction rates 408 and multiple transaction latency averages 410. The user interface 400, in this example, presents both current transaction rates 412 and previous transaction rates 414 for the selected application as well as current transaction latency averages 416 and previous transaction latency averages 418. As seen in FIG. 4, the current and previous transaction metrics include transaction metrics for multiple time periods, e.g., transaction metrics per minute, per hour, per day, per week, and per month. Additional or alternative time periods may be selectively presented at the user interface 400.

As seen in FIG. 4, the user interface 400 may also indicate deviations between the current transaction metrics and the previous transaction metrics. The deviations, in this example, are expressed as a percentage of the change of the current transaction metric relative to the previous transaction metric. In particular, the current per minute transaction rate is shown, in this example, to have declined by 40% relative to the previous per minute transaction rate. Similarly, the current per minute transaction latency average is shown, in this example, to have increased by 82%. Upon viewing these deviations in the per minute transaction rate or transaction latency average, a user may initiate an investigation to determine whether any technical issues have occurred at the application or application server for which remedial efforts are needed.

As described above, the transaction log evaluation module may continually parse transaction information in the transaction logs and continually update the transaction metrics as transactions are performed at the enterprise computing system. The transaction status evaluation module may, in turn, continually compare transaction metrics for current time periods to previous time periods in order to provide alerts of any deviations in the transaction metrics. It will be appreciated that transaction metrics for relatively shorter time periods (e.g., per minute) may be compared to identify more immediate technical issues that should be investigated. For example, a rapid decrease in transaction rate or a rapid increase in transaction latency average during the current minute may indicate that an application has crashed and needs to be restarted. It will also be appreciated that transaction metrics for relatively longer time periods (e.g., per month) may compared to identify more gradual technical issues that should be investigated. For example, a gradual decrease in transaction rate or a gradual increase in transaction latency average over the current month may indicate a hardware failure at one of the application servers.

A user may initiate an investigation into a deviation observed from the transaction information presented at the user interface 400, or the transaction status evaluation module may instruct the alert module to generate an alert in response to detecting a deviation in a current transaction metric. As described above, the transaction status evaluation module may determine an alert should be generated when the deviation in a current transaction metric exceeds a predetermined difference threshold. As seen in FIG. 4, the deviations are expressed, in this example, as percentages at the user interface 400.

The user interface 400 shown by way of example in FIG. 4 illustrates the selection of a single application and presentation of transaction metrics corresponding to transactions associated with the selected application. As noted above, however, the user interface 400 may also be configured to receive selections of multiple applications to view transaction metrics corresponding to transactions between the selected applications. A user may select a first and second application via the user interface, and the transaction log evaluation module may obtain transaction metrics corresponding to transactions between the selected applications. The user may also specify a desired time period within which transaction metrics for the selected applications are compared, e.g., a specified hour, day, week, month, and so forth. The user may also select via the user interface a data range for evaluation. A user may also select one or more desired transaction metric types to evaluate, e.g., transaction rate or transaction latency average. The user interface module may provide the transaction log evaluation module with the selected applications, the specified time period or date range, and the selected transaction metric types. The transaction log evaluation module may then parse the transaction logs to identify the transactions within the specified time period or date range that occurred between the selected applications and obtain transaction metrics for the transaction metric types selected. In this way, the user interface advantageously provides the user with significant flexibility in evaluating and comparing transaction metrics between computing resources.

As noted above, a user interface of a transaction evaluation system may also be configured to present transaction load distribution percentages. The transaction load distribution percentages may be included with the application servers listed at the user interface. In this way, a user may easily observe how transactions are routed to and distributed across the computing resources of the enterprise computing system. If the transaction load distribution information indicates an imbalance between the number of transaction routed to one computing resource relative to another computing resource, then the user may initiate efforts to balance the distribution of transactions across computing resources, e.g., by adding additional computing resources or making adjustments to the service gateway.

Figure 5:
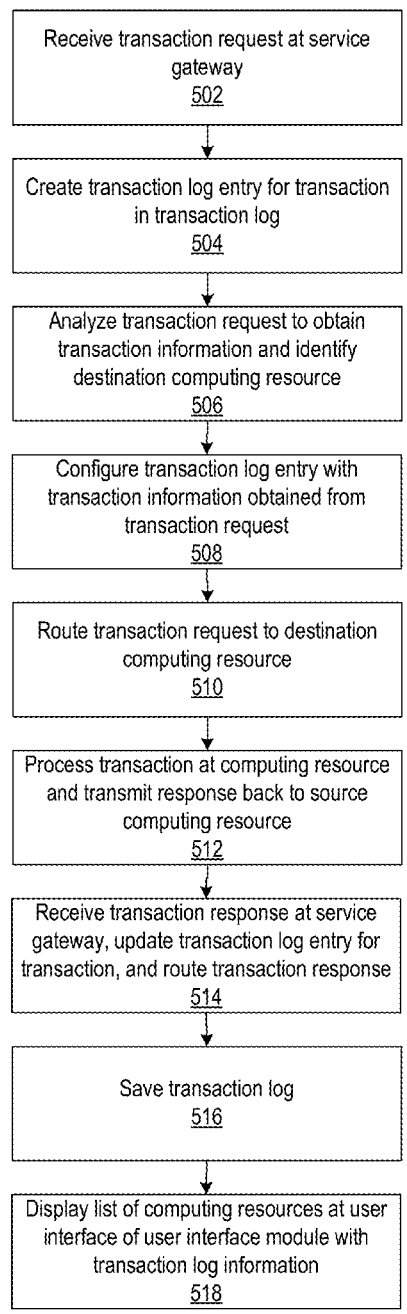
FIG. 5 is a flowchart of example method steps for parsing and evaluation transaction log information from transaction logs.

Referring now to FIG. 5, a flowchart 500 of example method steps for parsing and evaluation transaction log information from transaction logs is shown. A service gateway may receive a transaction request (block 502) and a transaction monitoring agent may create a new transaction log entry for the transaction in a transaction log (block 504). The transaction monitoring agent may analyze the transaction request to obtain transaction information and identify the destination computing resource (block 506). The transaction monitoring agent may configure the transaction log entry to include information obtained from the transaction request (block 508), e.g., a timestamp the transaction request was received, an address of the source computing resource, and an address of the destination computing resource.

The service gateway may then route the transaction request to the destination computing resource (block 510), and the destination computing resource may process the transaction and submit a transaction response back to the source computing resource (block 512). As noted above, processing the transaction may include submitting additional transaction requests to other computing resources for which transaction log entries may also be created. The service gateway may receive the transaction response, update the transaction log entry for the transaction, and route the transaction response back to the source computing resource (block 514). Updating the transaction log entry may include analyzing the transaction response and configuring the transaction log entry with information obtained from the transaction response, e.g., a timestamp the transaction response was received and whether the transaction was successfully processed. The transaction monitoring agent may then save the transaction log having the new transaction log entry (block 516). The transaction log information may then be parsed and presented at a user interface along with a list of the computing resources (block 518) as described above.

Figure 6:
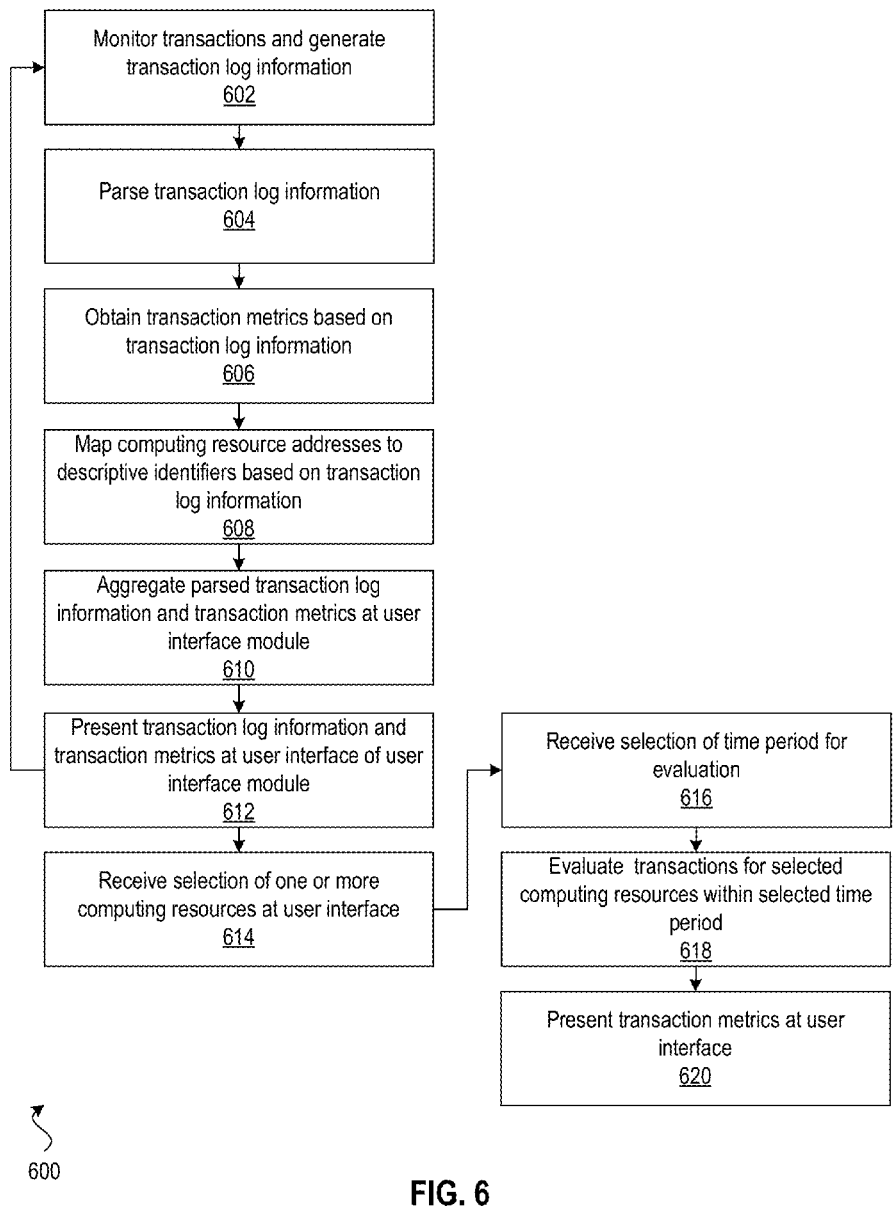
FIG. 6 is a flowchart of example method steps for presenting transaction log information at a user interface of a transaction evaluation system.

Referring now to FIG. 6, a flowchart 600 of example method steps for presenting transaction log information at a user interface of a transaction evaluation system is shown. A service gateway may route transactions between computing resources and a transaction monitoring agent may generate transaction log information for the transactions (block 602). A transaction log evaluation module may parse the transaction information (block 604) and obtain transaction metrics based on the transaction log information (block 606) as described above. Computing resource addresses may also be mapped to more user-friendly descriptive names based on the transaction log information (block 608). A user interface module may aggregate the transaction log information and transaction metrics (block 610) and present the transaction log information and transaction metrics at a user interface (block 612), e.g., with a list of selectable computing resources as described above.

The user interface may receive a selection from a user of one or more computing resources at the user interface (block 614) as well as a selection of a time period for evaluation (block 616). As described above, a user may select one computing resource to evaluate transaction log information corresponding to transactions associated with that computing resource or may select multiple computing resources to evaluate transaction log information corresponding to transactions between the selected computing resources. The transaction log evaluation module may evaluate the transaction log information (block 618), e.g., to obtain transaction metrics corresponding to transactions within the selected time period and associated with the one or more selected computing resources. The transaction log evaluation module may provide the transaction metrics for presentation at the user interface (block 620). As described above, the transaction metrics may include current and previous transaction metrics for various time periods.

Figure 7:
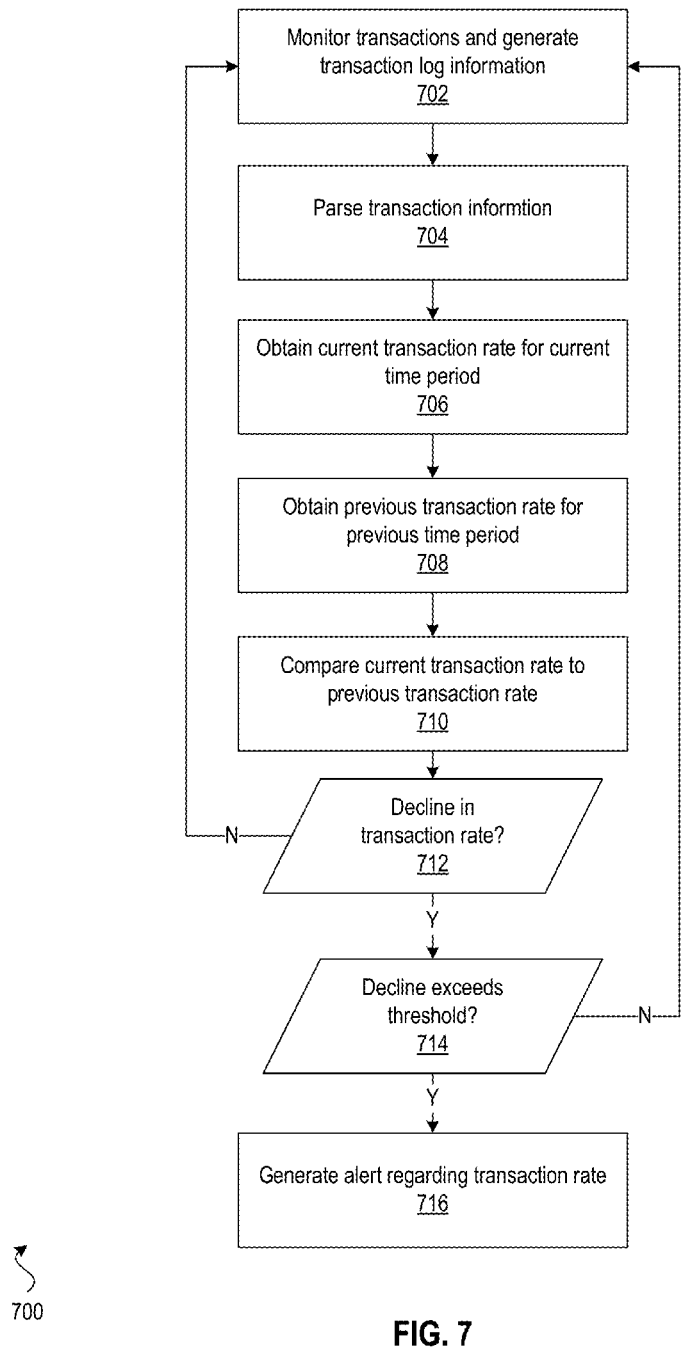
FIG. 7 is a flowchart of example method steps for identifying deviations in transaction rates.

Referring now to FIG. 7, a flowchart 700 example method steps for identifying deviations in transaction rates is shown. As described above, a transaction monitoring agent of a service gateway may monitor transactions routed by the service gateway and generate transaction log information (block 702). A transaction log evaluation module may parse the transaction log information (block 704) in order to obtain transaction rates for a current time period (block 706) and to obtain transaction rates for a previous time period (block 708). The transaction log evaluation module may provide the current and previous transaction rates to a transaction status evaluation module which compares the transaction rates (block 710). If there has been a decline in the transaction rate (block 712:Y) and the magnitude of the decline exceeds a predetermined threshold (block 714:Y), then the transaction status evaluation module may instruct the alert module to generate an alert regarding the transaction rate (block 716). For a per minute transaction rate, for example, the transaction status evaluation module may instruct the alert module to generate an alert when the current transaction rate has declined by more than ten transactions per minute. If the current transaction rate has not declined from the previous transaction rate (block 712:N) or if the decline does not exceed the predetermined threshold (block 714:N), then no alert may be generated and the transaction monitoring agent may continue to monitor the transactions routed by the service gateway (block 702).

Figure 8:
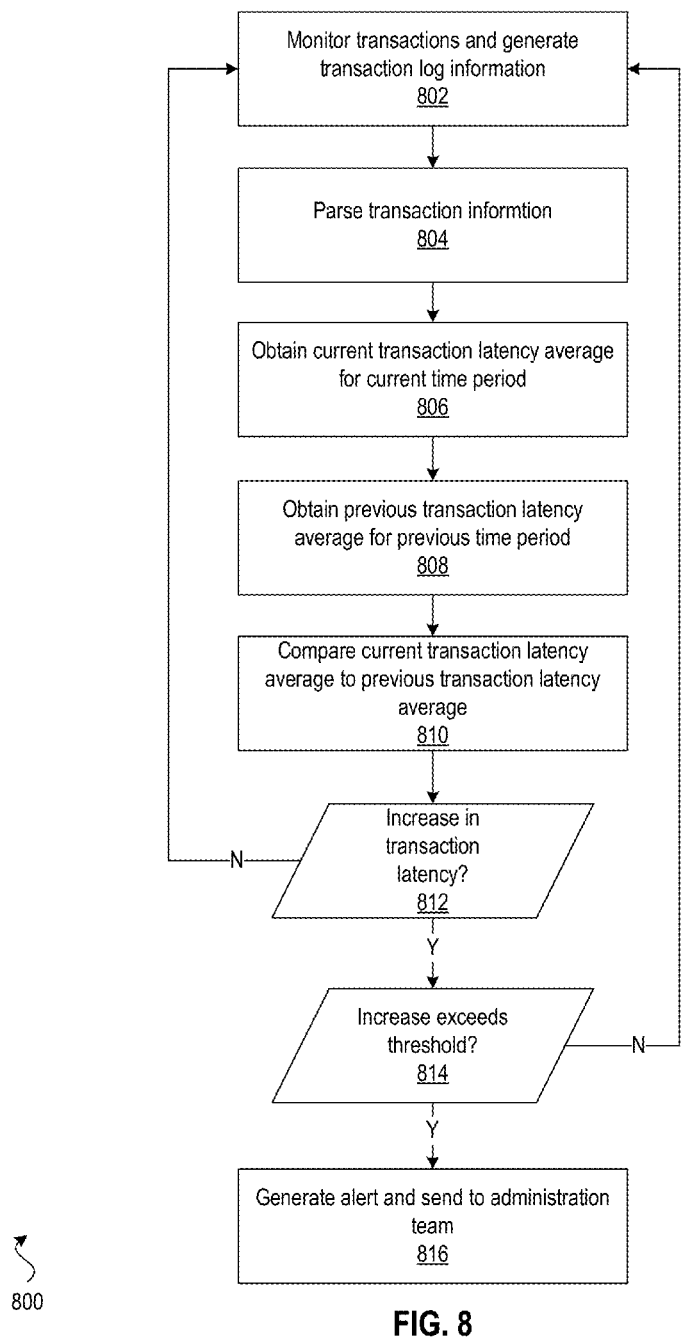
FIG. 8 is a flowchart of example method steps for identifying deviations in transaction latency averages.

Referring now to FIG. 8, a flowchart 800 identifying deviations in transaction latency averages is shown. A transaction monitoring agent of a service gateway may monitor transactions routed by the service gateway and generate transaction log information (block 802) as described above. A transaction log evaluation module may parse the transaction log information (block 804) in order to obtain transaction latency averages for a current time period (block 806) and to obtain transaction latency averages for a previous time period (block 808). The transaction log evaluation module may provide the current and previous transaction latency averages to a transaction status evaluation module which compares the transaction latency averages (block 810). If there has been an increase in the transaction latency average (block 812:Y) and the magnitude of the increase exceeds a predetermined threshold (block 814:Y), then the transaction status evaluation module may instruct the alert module to generate an alert regarding the transaction latency average (block 816). For a per minute transaction latency average, for example, the transaction status evaluation module may instruct the alert module to generate an alert when the current transaction latency average has increased by more than 50 ms. If the current transaction latency average has not increased from the previous transaction latency average (block 812:N) or if the increase does not exceed the predetermined threshold (block 814:N), then no alert may be generated and the transaction monitoring agent may continue to monitor the transactions routed by the service gateway (block 802).

Figure 9:
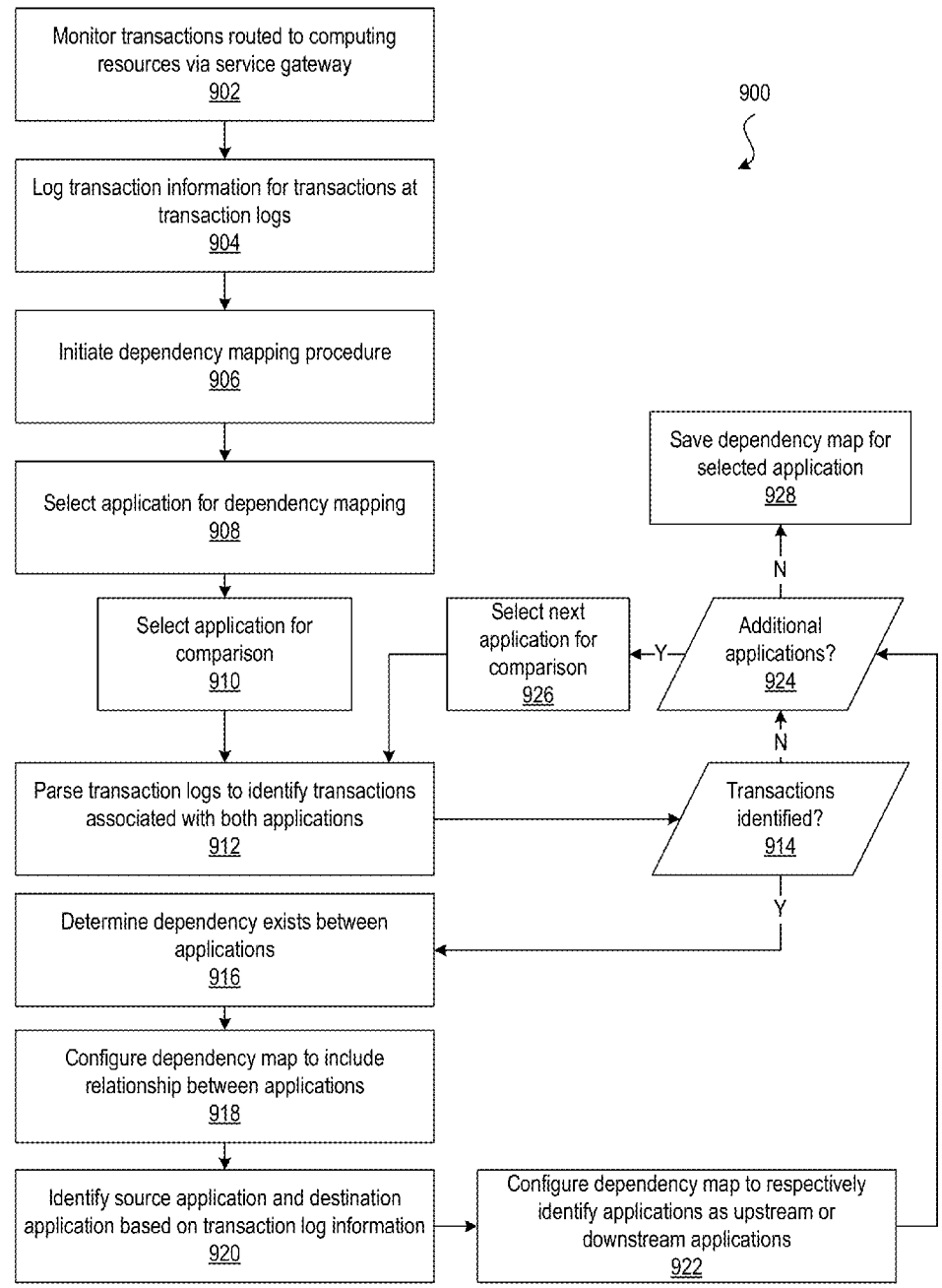
FIG. 9 is a flowchart of example method steps for generating a dependency map identifying dependencies among computing resources.

Referring now to FIG. 9, a flowchart 900 of example method steps for generating a dependency map identifying dependencies among computing resources is shown. The steps shown by way of example in FIG. 9 may be performed to generate a dependency map configured to include relationships between related applications. A transaction monitoring agent may monitor transactions routed to computing resources via a service gateway (block 902) as described above. The transaction monitoring agent may log transaction information corresponding to the transactions at transaction logs (904). Once the transaction monitoring agent has collected transaction log information, the dependency mapping module may initiate the dependency mapping procedure (block 906) and select an application for dependency mapping (block 908). The dependency mapping module may then select another application for comparison to the selected application (block 910).

The dependency mapping module may retrieve the transaction logs and parse the transaction log information in order to identify any transactions between the selected applications (block 912). If the transaction log information indicates that transactions occurred between the selected applications (block 914:Y), the dependency mapping module may determine that a dependency exists between the selected applications (block 916) and configure the dependency map to include a relationship between the applications (block 918). The dependency mapping module may also evaluate the transaction log information to identify which of the selected applications is the source application and which is the destination application (block 920). The dependency mapping module may thus also configure the dependency map to identify which application is upstream and which application is downstream relative to one another (block 922).

Having configured the dependency map to indicate the dependency between the selected applications, the dependency mapping module may determine whether any additional applications remain for comparison. If additional applications do remain for comparison (block 924:Y), then the dependency mapping module may select the next application (block 926) and repeat steps 912-922 for the next application selected for comparison. Similarly if the dependency mapping module does not identify any transactions that occurred between the selected applications (block 914: N), the dependency mapping module may determine whether any additional transactions remain to be compared to the selected application (block 924). If no applications remain to be compared to the selected application (block 924:N) then the dependency mapping module may save the dependency map for the application (block 928).

Using the dependency map, proactive alerts may be provided if deviations in transaction metrics are detected at upstream applications. Upon detecting a deviation in one or more transaction metrics for an application, the alert module may retrieve the dependency map and identify any applications downstream of that application. For each application identified in the dependency map as a downstream application relative to the upstream application, the alert module may provide an alert (e.g., to an administration team) to indicate that potential deviations in transaction metrics might occur at the downstream applications due to the deviations in transaction metrics detected at the upstream application.

Figure 10:
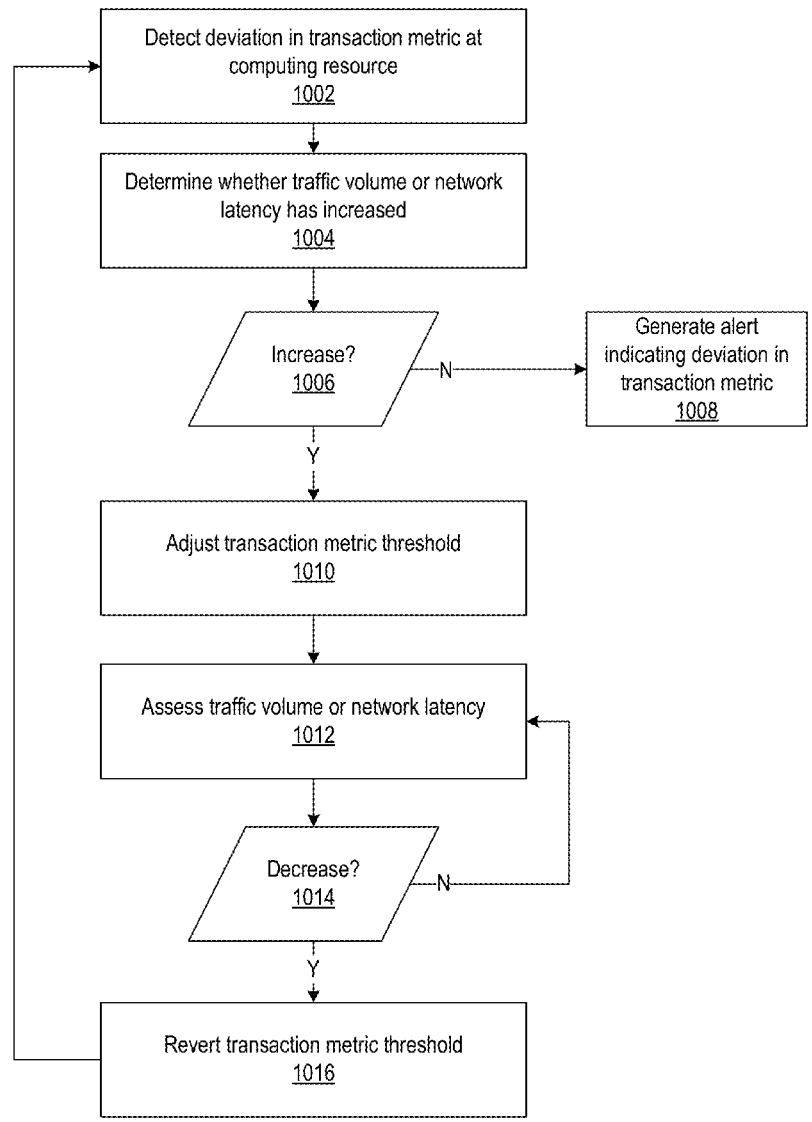
FIG. 10 is a flowchart of example method steps for adjusting transaction metric thresholds of a transaction evaluation system.

Referring now to FIG. 10, a flowchart 1000 of example method steps for automatically adjusting transaction metric thresholds of a transaction evaluation system is shown. A transaction status evaluation module may detect a deviation in a transaction metric at a computing resource (block 1002), e.g., a decrease in the transaction rate or an increase in the transaction latency average. The transaction status evaluation module may instruct the threshold adjustment module to determine whether the deviation in the transaction metric is expected. The threshold adjustment module may determine whether the deviation in the transaction metric is expected based on various criteria, e.g., the volume of traffic at an application server or the latency of a communication network used to access the application server. The threshold adjustment module may determine whether the deviation in transaction metric is expected based on other types of criteria that will be appreciated by those skilled in the art.

In this example, the threshold adjustment module may determine whether traffic volume or network latency has increased (block 1004). If the threshold adjustment module determines that the traffic volume or network latency has not increased (block 1006:N), then the deviation in the transaction metric may not be expected. Accordingly the transaction status evaluation module may instruct the alert module to generate an alert indicating the deviation in the transaction metric (block 1008). If, however, the threshold adjustment module determines that traffic volume or network latency has increased (block 1006:Y), then the deviation in the transaction metric might be expected. Accordingly the threshold adjustment module may adjust a transaction metric threshold used to identify the deviation at the transaction status evaluation module (block 1010). When adjusting a transaction metric threshold, the threshold adjustment module may adjust the transaction metric threshold to increase or decrease its value.

The threshold adjustment module may continually assess the traffic volume or network latency (block 1012) in order to determine whether the traffic volume or network latency has decreased, e.g., back to normal levels. Once the traffic volume or network latency decreases (block 1014:Y), the threshold adjustment module may revert the transaction latency threshold (block 1016), e.g., back to the previous value before the increase in traffic volume or network latency occurred. Assessment of the traffic volume or network latency may continue (block 1012) if the traffic volume or network latency has not yet decreased. As noted above, the threshold adjustment module may also be configured to automatically adjust transaction latency thresholds upon the start of peak usage periods and automatically revert the transaction latency thresholds upon the start of off-peak usage periods. In this way alerts and subsequent remedial efforts might be suppressed for deviations in transaction metrics that are expected.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

The invention claimed is:

1. A computer-implemented method for monitoring transaction processing at a computing system comprising:
monitoring transactions between computing resources of a computing system using a transaction monitoring agent wherein access to the computing resources is obtained via a communication network;
generating, by the transaction monitoring agent, transaction log information corresponding to the transactions;

obtaining, automatically by a computing device, a current transaction rate for a current time period based on the transaction log information;

obtaining, automatically by the computing device, a previous transaction rate for a previous time period prior to the current time period based on the transaction log information;

comparing, by the computing device, the current transaction rate to the previous transaction rate;

generating, by the computing device, a transaction rate alert responsive to determining that the previous transaction rate exceeds the current transaction rate by greater than a first predetermined transaction rate difference threshold used to trigger alerts;

determining, by the computing device, that a network latency on the communication network has increased;

adjusting the first predetermined transaction rate difference threshold used to trigger alerts to a second, different predetermined transaction rate difference threshold used to trigger alerts automatically by the computing device in response to the determining that the network latency has increased;

determining, by the computing device, that the network latency on the communication network has decreased; and reverting the second predetermined transaction rate difference threshold used to trigger alerts to the first predetermined transaction rate threshold used to trigger alerts automatically by the computing device in response to the determining that the network latency has decreased.

2. The method of claim 1 wherein:

the current transaction rate is one of a plurality of current transaction rates obtained for the current time period based on the transaction log information; and the plurality of current transaction rates includes a current minute transaction rate, a current hour transaction rate, a current day transaction rate, a current week transaction rate, and a current month transaction rate.

3. The method of claim 2 wherein the transaction log information includes transaction time information and further comprising:

obtaining, automatically by the computing device, a current transaction latency average for the current time period based on the transaction time information;

obtaining, automatically by the computing device, a previous transaction latency average for the previous time period based on the transaction time information;

comparing, by the computing device, the current transaction latency average to the previous transaction latency average; and generating, by the computing device, a transaction latency alert responsive to determining that the current transaction latency average exceeds the previous transaction latency average.

4. The method of claim 3 wherein:

the current transaction latency average is one of a plurality of current transaction latency averages obtained for the current time period based on the transaction time information; and the plurality of current transaction latency averages include a current minute transaction latency average, a current hour transaction latency average, a current day transaction latency average, a current week transaction latency average, and a current month transaction latency average.

5. The method of claim 4 wherein:

the current transaction rate, previous transaction rate, current transaction latency average, and previous transaction latency average are based on transaction information corresponding to transactions performed between a first computing resource and a second computing resource of the computing system.

6. The method of claim 4 wherein:

the current transaction rate, previous transaction rate, current transaction latency average, and previous transaction latency average are based on transaction information corresponding to transactions respectively performed between a first computing resource and a plurality of computing resources of the computing system.

7. A system for monitoring transaction processing at a computing system comprising:

at least one processor;

a data store that stores transaction log information collected by a transaction monitoring agent and corresponding to transactions performed between computing resources of a computing system wherein the transaction log information includes transaction time information and wherein access to the computing resources is obtained via a communication network of the computing system; and memory storing instructions that, when executed by the at least one processor, cause the system to:

evaluate the transaction log by parsing the transaction log information, obtaining a current transaction metric for a current time period based on the transaction log information, and obtaining a previous transaction metric for a previous time period prior to the current time period based on the transaction log information;

evaluate a status of the current transaction metric by comparing the current transaction metric to the previous transaction metric and determining whether to trigger an alert based on a comparison between the current transaction metric and the previous transaction metric; and generating the alert in response to determining that the current transaction metric deviates from the previous transaction metric by greater than a first predetermined transaction metric difference threshold used to trigger alerts;

evaluate a network latency on the communication network by determining whether the network latency has either increased or decreased; and adjust the first predetermined transaction metric difference threshold used to trigger alerts by either (i) adjusting the first predetermined transaction metric difference threshold used to trigger alerts to a second predetermined transaction metric different threshold in response to determining that the network latency has increased, or (ii) reverting the first predetermined transaction metric difference threshold to a previous predetermined transaction metric difference threshold in response to determining that the network latency has decreased.

8. The system of claim 7 wherein:

the current transaction metric is a current transaction rate obtained based on the transaction log information;

the previous transaction metric is a previous transaction rate obtained based on the transaction log information; and the first predetermined transaction metric difference threshold is a predetermined transaction rate difference threshold.

9. The system of claim 7 wherein:
the current transaction metric is a current transaction latency average obtained based on the transaction time information;
the previous transaction metric is a previous transaction latency average based on the transaction time information; and
the first predetermined transaction metric difference threshold is a predetermined transaction latency difference threshold.

10. The system of claim 7 wherein:
the instructions, when executed by the at least one processor, further cause the system to present, at a display device, a user interface comprising:
 a list of at least a portion of the computing resources of the computing system, and
 an indication of at least one transaction metric associated with one of the computing resources included in the list;
wherein the portion of the computing resources included in the list are selectable by a user via the user interface.

11. The system of claim 10 wherein:
the instructions, when executed by the at least one processor, further cause the system to:
 select one of the computing resources included in the list presented at the user interface based on a selection received from the user via the user interface,
 obtain a plurality of transaction metrics based on transaction log information corresponding to transactions associated with the computing resource selected, and
 present the plurality of transaction metrics at the user interface; and
the plurality of transaction metrics includes a per minute transaction metric, a per hour transaction metric, a per day transaction metric, a per month transaction metric, and a per year transaction metric.

12. The system of claim 10 wherein:
the instructions, when executed by the at least one processor, further cause the system to:
 select a first computing resource and a second computing resource included in the list presented at the user interface based on selections received from the user via the user interface,
 obtain at least one transaction metric based on transaction log information corresponding to transactions between the first computing resource and the second computing resource, and
 present the at least one transaction metric at the user interface.

13. The system of claim 10 wherein:
the computing resources include a plurality of applications for processing respective transactions; and
the instructions, when executed by the at least one processor, further cause the system to generate a dependency map for one of the applications based on an evaluation of the transaction log information.

14. The system of claim 13 wherein:
the application is a first application; and
generating the dependency map comprises:
 identifying one or more transactions between the first application and a second application of the plurality of applications based on evaluation of the transaction log information,
 configuring the dependency map to include a relationship between the first application and the second application,
 determining whether the first application is upstream or downstream relative to the second application based on evaluation of the transaction log information,
 identifying the first application as downstream of the second application in the dependency map responsive to determining that the first application provided a transaction request to the second application, and
 identifying the first application as upstream of the second application in the dependency map responsive to determining that the first application provided a transaction response to the second application.

15. The system of claim 14 wherein:
the instructions, when executed by the at least one processor, further cause the system to:
 retrieve the dependency map responsive to a determination that the current transaction metric deviates from the previous transaction metric,
 identify one or more downstream applications related to the first application based on the dependency map, and
 transmit for each of the one or more downstream applications an alert indicating a deviation between the current transaction metric and the previous transaction metric.

16. Non-transitory computer-readable media having instructions stored thereon that, when executed by a processor, cause a computing device to perform steps for monitoring transaction processing at a computing system, the steps comprising:
 generating, using a transaction monitoring agent, transaction log information corresponding to transactions occurring between computing resources of a computing system wherein access to the computing resources is obtained via a communication network;
 obtaining automatically a first transaction rate for a first time period based on the transaction log information;
 obtaining automatically a second transaction rate for a second time period prior to the first time period based on the transaction log information;
 comparing the first transaction rate to the second transaction rate;
 generating a transaction rate alert responsive to determining that the second transaction rate exceeds the first transaction rate by greater than a first predetermined transaction rate difference threshold used to trigger alerts;
 determining that a network latency on the communication network has increased;
 adjusting the first predetermined transaction rate difference threshold used to trigger alerts to a second, different predetermined transaction rate difference threshold used to trigger alerts automatically in response to the determining that the network latency has increased;
 determining that the network latency on the communication network has decreased; and
 reverting the second predetermined transaction rate difference threshold used to trigger alerts to the first predetermined transaction rate threshold used to trigger alerts automatically in response to the determining that the network latency has decreased.

17. The non-transitory computer-readable media of claim 16 wherein:
the transaction log information further includes transaction time information;
the instructions, when executed by the processor, cause the computing device to further perform steps comprising:
obtaining automatically a first transaction latency average for the first time period based on the transaction time information,
obtaining automatically a second transaction latency average for the second time period prior to the first time period based on the transaction time information,
comparing the first transaction latency average to the second transaction latency average; and
generating a transaction latency alert in response to determining that the first transaction latency exceeds the second transaction latency average.

18. The non-transitory computer-readable media of claim 17 wherein the instructions, when executed by the processor, cause the computing device to further perform steps comprising:
presenting a list of at least a portion of the computing resources of the computing system at a user interface;
presenting at least one transaction metric associated with one of the computing resources included in the list at the user interface;
configuring the list such that the portion of the computing resources included in the list are selectable by a user via the user interface;
receiving a selection via the user interface of one of the computing resources included in the list;
obtaining a plurality of transaction metrics based on transaction log information corresponding to transactions associated with the computing resource selected; and
presenting the plurality of transaction metrics at the user interface;
wherein the plurality of transaction metrics includes a per minute transaction metric, a per hour transaction metric, a per day transaction metric, a per month transaction metric, and a per year transaction metric.

19. The non-transitory computer-readable media of claim 18 wherein the instructions, when executed by the processor, cause the computing device to further perform steps comprising:
generating a dependency map for one of the computing resources based on evaluation of the transaction log information.

\* \* \* \* \*